United States Patent
Lee et al.

(10) Patent No.: US 11,699,920 B2
(45) Date of Patent: Jul. 11, 2023

(54) DEVICE AND METHOD FOR RECEIVING POWER WIRELESSLY

(71) Applicant: Samsung Electronics Co., Ltd., Suwon-si (KR)

(72) Inventors: Hankyu Lee, Suwon-si (KR); Seungchul Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 17/071,122

(22) Filed: Oct. 15, 2020

(65) Prior Publication Data

US 2021/0242717 A1 Aug. 5, 2021

Related U.S. Application Data

(60) Provisional application No. 62/969,781, filed on Feb. 4, 2020.

(30) Foreign Application Priority Data

Apr. 8, 2020 (KR) ........................ 10-2020-0042771

(51) Int. Cl.
*H02J 50/10* (2016.01)
*H02J 13/00* (2006.01)

(52) U.S. Cl.
CPC ........ *H02J 50/10* (2016.02); *H02J 13/00026* (2020.01)

(58) Field of Classification Search
CPC ............................ H02J 50/10; H02J 13/00026

USPC ........................................................ 320/108
See application file for complete search history.

(56) References Cited

U.S. PATENT DOCUMENTS

| | | | |
|---|---|---|---|
| 6,658,124 B1 * | 12/2003 | Meadows | H04R 25/55 381/328 |
| 9,698,761 B2 | 7/2017 | Waffenschmidt et al. | |
| 9,853,506 B2 | 12/2017 | Liu et al. | |
| 10,291,073 B2 | 5/2019 | Trudeau et al. | |
| 2009/0270032 A1 * | 10/2009 | Kassayan | H04B 13/005 455/41.1 |
| 2010/0194333 A1 * | 8/2010 | Kassayan | H02J 50/10 320/108 |

(Continued)

FOREIGN PATENT DOCUMENTS

| KR | 10-2015-0011273 A | 1/2015 |
|---|---|---|
| KR | 10-2016-0142524 A | 12/2016 |
| KR | 10-2017-0047768 A | 5/2017 |

*Primary Examiner* — Alfonso Perez Borroto
(74) *Attorney, Agent, or Firm* — NSIP Law

(57) ABSTRACT

A wireless power receiver and a wireless power reception method are disclosed. The wireless power receiver includes a charging element, a receiving coil configured to wirelessly receive power from a wireless power transmitter, a rectifier configured to convert an alternating current (AC) voltage generated from the receiving coil to a direct current (DC) voltage, and to output the DC voltage, a voltage converter configured to generate a charging current to charge the charging element, based on the DC voltage output from the rectifier, a current measurer configured to measure the charging current transferred to the charging element, and a controller configured to control a level of the charging current generated from the voltage converter based on a result of the measuring.

20 Claims, 7 Drawing Sheets

(56) References Cited

U.S. PATENT DOCUMENTS

| | | | | |
|---|---|---|---|---|
| 2010/0290647 A1* | 11/2010 | Abolfathi | ............... | G11B 33/06 |
| | | | | 381/151 |
| 2014/0275847 A1* | 9/2014 | Perryman | .............. | A61B 5/369 |
| | | | | 607/45 |
| 2016/0381471 A1* | 12/2016 | Henriksen | ............ | H04R 25/554 |
| | | | | 381/315 |
| 2017/0310145 A1* | 10/2017 | Crosby | ................... | H02J 50/12 |
| 2019/0068001 A1* | 2/2019 | Lovas | ..................... | H02J 50/10 |
| 2020/0366133 A1 | 11/2020 | Lee et al. | | |

* cited by examiner

DEVICE AND METHOD FOR RECEIVING POWER WIRELESSLY

CROSS-REFERENCE TO RELATED APPLICATIONS

This application claims the benefit under 35 U.S.C. § 119(e) of U.S. Provisional Application No. 62/969,781 filed on Feb. 4, 2020, in the U.S. Patent and Trademark Office, and Korean Patent Application No. 10-2020-0042771 filed on Apr. 8, 2020, in the Korean Intellectual Property Office, the entire disclosures of which are incorporated herein by reference for all purposes.

BACKGROUND

Field

The following description relates to a technology for wirelessly transmitting and receiving power among devices.

2. Description of Related Art

Wireless power refers to energy that is transferred from a wireless power transmitter to a wireless power receiver through magnetic coupling. A wireless charger system includes a source device configured to wirelessly transmit power and a target device configured to wirelessly receive the power. The source device may also be referred to as the wireless power transmitter, and the target device may also be referred to as the wireless power receiver.

The source device includes a source resonator, and the target device includes a target resonator. Between the source resonator and the target resonator, the magnetic coupling or resonant coupling is formed. Through such magnetic coupling or resonant coupling, power is wirelessly transferred from the source device to the target device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a wireless power receiver including a charging element, a receiving coil configured to wirelessly receive power from a wireless power transmitter, a rectifier configured to convert an alternating current (AC) voltage generated from the receiving coil to a direct current (DC) voltage, and to output the DC voltage, a voltage converter configured to generate a charging current to charge the charging element, based on the DC voltage output from the rectifier, a current measurer configured to measure the charging current transferred to the charging element, and a controller configured to control a level of the charging current generated from the voltage converter based on a result of the measuring.

The controller may be configured to control the voltage converter based on the result of the measuring of the charging current and the DC voltage output from the rectifier.

The controller may be configured to compare a magnitude of the DC voltage output from the rectifier and a threshold voltage, and to determine whether to control the voltage converter based on a result of the comparing.

The controller may be configured to transmit a voltage control signal to the voltage converter, in response to the magnitude of the output voltage being greater than the threshold voltage, and the voltage converter is further configured to regulate the magnitude of the DC voltage output from the rectifier, in response to the voltage control signal being received.

The magnitude of the DC voltage output from the rectifier may be regulated by the voltage converter to reach the threshold voltage.

The controller may be configured to regulate a magnitude of the threshold voltage based on a change in the level of the charging current.

The controller may be configured to search for a target threshold voltage that maximizes the level of the charging current based on the change in the level of the charging current occurring by the regulating of the magnitude of the threshold voltage.

The controller may be configured to determine a target threshold voltage to be a magnitude of threshold voltage when the level of the charging current is greatest, and to regulate the magnitude of the DC voltage output from the rectifier by controlling the voltage converter based on the target threshold voltage.

The wireless power receiver may include a capacitor configured to store the DC voltage output from the rectifier, wherein a first end of the capacitor is connected to the voltage converter and the rectifier, and a second end of the capacitor is connected to a reference voltage terminal.

The wireless power receiver may be an implantable wireless power receiver configured to be implanted in a living body.

The wireless power transmitter may be comprises a smartphone, a tablet personal computer (PC), a cellular phone, an electronic notebook, or a wearable electronic device.

In another general aspect, there is provided a wireless power reception method to be performed by a wireless power receiver, including wirelessly receiving power from a wireless power transmitter through a receiving coil, converting an alternating current (AC) voltage generated from the receiving coil to a direct current (DC) voltage, using a rectifier, generating a charging current to charge a charging element and transferring the generated charging current to the charging element, using a voltage converter, measuring the charging current transferred to the charging element, and searching for a target charging current by controlling the voltage converter based on a result of the measuring.

A level of the charging current may be regulated by the controlling of the voltage converter.

The searching may include comparing a magnitude of the DC voltage output from the rectifier and a threshold voltage, and determining whether to control the voltage converter based on a result of the comparing.

The determining of whether to control the voltage converter may include transferring a voltage control signal to the voltage converter, in response to the magnitude of the DC voltage output from the rectifier being greater than the threshold voltage, and the voltage converter being configured to regulate the magnitude of the DC voltage output from the rectifier, in response to the voltage control signal being received.

The searching may include determining whether to regulate the threshold voltage based on a change in a level of the charging current.

The searching may include searching for a target threshold voltage that maximizes the level of the charging current based on the change in the level of the charging current occurring by the regulating of the threshold voltage.

The searching may include determining a target threshold voltage that is a magnitude of the threshold voltage when the level of the charging current is greatest, and regulating the magnitude of the DC voltage output from the rectifier by controlling the voltage converter based on the determined target threshold voltage.

The wireless power receiver may include an implantable wireless power receiver configured to be implanted in a living body, and the wireless power transmitter comprises a smartphone, a tablet personal computer (PC), a cellular phone, an electronic notebook, or a wearable electronic device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
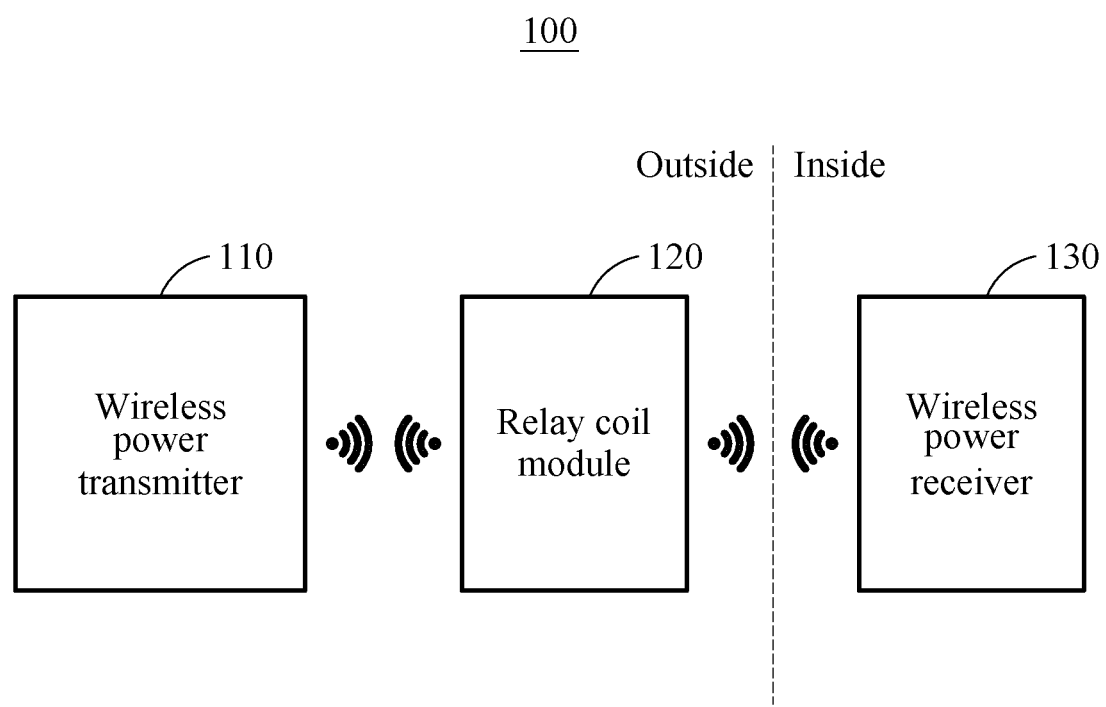
FIG. 1 is a diagram illustrating an example a wireless power transfer apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Although terms such as "first," "second," and "third," A, B, (a), (b), may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example a wireless power transfer apparatus.

Referring to FIG. 1, a wireless power transfer apparatus 100 may wirelessly transfer power from a wireless power transmitter 110 disposed outside a living body to a wireless power receiver 130 disposed inside the living body or attached to the living body. The wireless power transfer apparatus 100 includes the wireless power transmitter 110, a relay coil module 120, and the wireless power receiver 130.

The wireless power transmitter 110 may be disposed outside the living body and be configured to wirelessly transmit power. The wireless power transmitter 110 may be a smartphone, a tablet personal computer (PC), a cellular phone, an electronic notebook, a wearable electronic device, such as a smart watch, a smart band or smart glasses, other electronic product, such as a digital camera, a digital video camera, a portable game console, an MP3 player, a portable/personal multimedia player (PMP), a handheld e-book, a global positioning system (GPS) navigation, various Internet of Things (IoT) devices, a home appliance such as a television, a smart television, a refrigerator, a smart home device, or a vehicle such as a smart vehicle, an electric vehicle, or any other device capable of wireless communication consistent with that disclosed herein.

. For example, when the wireless power transmitter 110 is a smartphone, the wireless power transmitter 110 may wirelessly transmit power using a near-field communication (NFC) function.

The relay coil module 120 may be disposed outside the living body and configured to relay the power received from the wireless power transmitter 110 to the wireless power receiver 130 disposed inside the living body. The relay coil module 120 may be used as an impedance matching network. The relay coil module 120 may be wirelessly connected to the wireless power transmitter 110 by being separated from the wireless power transmitter 110 by a certain distance, or be attached to an outer surface of the living body. In an example, the relay coil module 120 may be embodied in a form of a patch to be attached to the outer surface of the living body.

The wireless power receiver 130 may wirelessly receive power from outside. The wireless power receiver 130 may be inserted in the living body or attached to the living body to sense bio-information of the living body or provide a stimulus to the living body, or a part of the living body, or an organ of the living body. In an example, the wireless power receiver 130 may be an ultra-small medical device. However, the wireless power receiver 130 is not limited to an ultra-small medical device, but may be any device that wirelessly receives power.

The wireless power receiver 130 may store energy received through wireless power transfer in a charging element that is capable of charging, such as, for example, a battery and a capacitor. In an example, the wireless power receiver 130 may wirelessly receive power from the wireless power transmitter 110 outside the living body to charge the charging element while being operated by the charging element. In another example, the wireless power receiver 130 may wirelessly receive power from the wireless power transmitter 110 outside the living body to charge the charging element without being operated by the charging element. For example, the wireless power receiver 130 may sense the bio-information of the living body including, for example, biopotential, heart rate, and movements, or apply an electrical signal to the living body. However, operations of the wireless power receiver 130 are not limited to the foregoing.

In general, a receiving coil included in the wireless power receiver 130 is smaller in size than a transmitting coil included in the wireless power transmitter 110, and a distance between the wireless power transmitter 110 and the wireless power receiver 130 is not always consistent, and thus load impedance mismatching may occur. The load impedance mismatching may result in a reduction in output power, which may be solved by disposing the relay coil module 120 between the wireless power transmitter 110 and the wireless power receiver 130. The relay coil module 120 may match a load impedance of the transmitting coil to an optimal load impedance, thereby increasing transmission power to be transferred from the wireless power transmitter 110.

In addition, when the wireless power receiver 130 is inserted deep in the living body or is extremely small in size, impedance matching may not be available in the transmitting coil of the wireless power transmitter 110. In an example, an impedance of the transmitting coil of the wireless power transmitter 110 may be matched to a target impedance through the relay coil module 120. For example, for such matching, a distance between the wireless power transmitter 110 and the relay coil module 120 may be changed, or a size of an auxiliary coil included in the relay coil module 120 may be changed.

In another example, the wireless power transmitter 110 may wirelessly transmit power to the wireless power receiver 130 without the relaying by the relay coil module 120. A coil used herein may be replaced with an antenna.

Each of the wireless power transmitter 110, the relay coil module 120, and the wireless power receiver 130 may include a coil, and each coil may have an optimal load impedance for optimal power transfer. The optimal load impedance refers to a load impedance value that that enables power received by a coil to be transferred to the maximum. Hereinafter, a method of regulating a voltage to be input to a voltage converter included in the wireless power receiver 130 by controlling the voltage converter, and matching a load impedance to an optimal load impedance at a power receiving end of the wireless power receiver 130 will be described. Through the method, it is possible to facilitate automatic optimal impedance matching of the wireless power receiver 130, and is thus possible to optimize power received by the wireless power receiver 130 according to input power.

Figure 2:
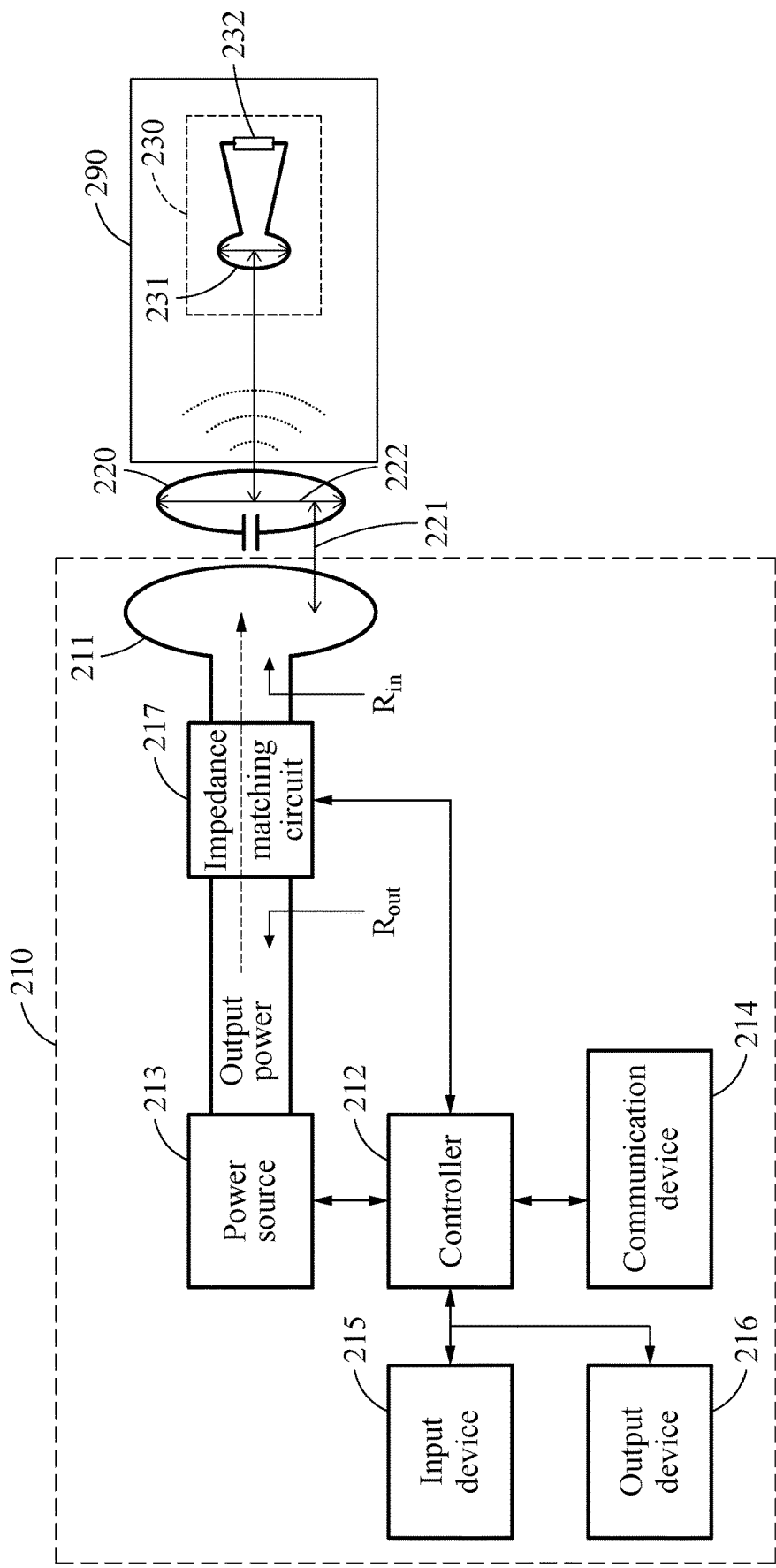
FIG. 2 is a diagram illustrating an example of a wireless power transmitter.

FIG. 2 is a diagram illustrating an example of a wireless power transmitter.

Referring to FIG. 2, a wireless power transmitter 210 includes a transmitting coil 211, a controller 212, a power source 213, a communication device 214, an input device 215, an output device 216, and an impedance matching circuit 217.

The transmitting coil 211 may be a coil configured to form mutual coupling with an auxiliary coil 220 of a relay coil module disposed outside a living body 290. For example, the transmitting coil 211 may be connected to a capacitor (not shown), and a resonant frequency of the transmitting coil 211 and the capacitor may be equal or similar to a resonant frequency of the auxiliary coil 220. In response to power being supplied, the transmitting coil 211 may form mutual coupling with the auxiliary coil 220 and wirelessly transmit power to the auxiliary coil 220 through the formed mutual coupling.

The controller 212 may control an operation of the wireless power transmitter 210. For example, the controller 212 may control power supply to the transmitting coil 211 from the power source 213. By controlling the power supply, the controller 212 may control power to be wirelessly transmitted to a wireless power receiver 230 disposed inside the living body 290 from the transmitting coil 211 through the auxiliary coil 220 by the mutual coupling. The controller 212 may initiate or suspend the power supply to the transmitting coil 211 from the power source 213. Although it is illustrated in FIG. 2 that the controller 212 controls the power source 213, examples are not limited thereto. In an example, the controller 212 may control be an electrical connection between the power source 213 and the transmitting coil 211.

The power source 213 may supply power to the transmitting coil 211 under the control of the controller 212. For example, the power source 213 may supply power having an alternating current (AC) voltage.

The communication device 214 may communicate with the relay coil module. For example, the communication device 214 may receive, from the relay coil module, information associated with power sensed by the relay coil module or transmit, to the relay coil module, an instruction associated with power transfer. The communication device 214 may transmit and receive information to and from the relay coil module through low-power communication, for example, NFC or Bluetooth low energy (BLE) communication.

The input device 215 may receive an input from a user. The input device 215 may include, for example, a keyboard configured to receive a keystroke as an input from a user, and a touchscreen or a touchpad configured to receive touch as an input from a user. In addition, the input device 215 may include, for example, a microphone configured to receive voice of a user as an input or a sensor configured to capture a gesture of the user. For example, the input device 215 may receive, from the user, a power transfer input that requests power transfer from the wireless power transmitter 210 to the wireless power receiver 230. In this example, in response to the power transfer input being received from the user through the input device 215, the controller 212 may control power to be transferred from the power source 213 to the transmitting coil 211.

The output device 216 may output information associated with wireless power transfer to the user. For example, the output device 216 may output, to the user, an instruction that instructs the user to move a position of the wireless power transmitter 210, or an instruction that instructs the user to maintain the position of the wireless power transmitter 210. The output device 216 may output at least one of visual information, haptic information, or tactile information, or acoustic information.

The impedance matching circuit 217 may match an output impedance $R_{out}$ of the wireless power transmitter 210 to a target impedance. The output impedance $R_{out}$ of the wireless power transmitter 210 may indicate an impedance observed from the power source 213 with respect to impedance matching circuit 217. The target impedance may vary based on a design and/or operation of the wireless power transmitter 201. In addition, an impedance observed from the transmitting coil 211 with respect to the impedance matching circuit 217 may be indicated herein as an impedance $R_{in}$ of the transmitting coil 211. When the impedance $R_{in}$ is matched to have an equal or similar value to the target impedance, a loss that may occur when power output from the power source 213 is transferred up to the transmitting coil 211 may be minimized. This is because the power output from the power source 213 is reflected from an input end of the transmitting coil 211 when the impedance $R_{in}$ of the transmitting coil 211 is not matched to the target impedance, but such power reflection is minimized when the impedance $R_{in}$ is matched to the target impedance.

In an example, the transmitting coil 211 may have a weak coupling coefficient less than a threshold, with respect to a receiving coil 231 of the wireless power receiver 230. For example, the transmitting coil 211 may be larger in size than the receiving coil 231.

In the absence of the auxiliary coil 220, the impedance $R_{in}$ of the transmitting coil 211 may not be matched to the target impedance only with the transmitting coil 211 and the receiving coil 231, due to weak mutual coupling between the transmitting coil 211 and the receiving coil 231. For example, when a distance between the transmitting coil 211 and the receiving coil 231 increases by an activity of the living body 290, or when the receiving coil 231 is too small in size, the impedance $R_{in}$ may not be matched to the target impedance.

Unlike the foregoing example, the impedance $R_{in}$ of the transmitting coil 211 may be readily matched to the target impedance by the relay coil module. The auxiliary coil 220 of an appropriate size may be disposed at a distance 221 from the transmitting coil 211, based on factors such as, a position of the transmitting coil 211 disposed outside the living body 290, a position of the auxiliary coil 220 outside the living body 290, a size of the receiving coil 231 inside the living body 290, and a depth of insertion of the receiving coil 231 in the living body 290. For example, by selecting a size 222 of the auxiliary coil 220 and/or regulating the distance 221 between the transmitting coil 211 and the auxiliary coil 220, it is possible to readily match the impedance $R_{in}$ of the transmitting coil 211 to the target impedance. Thus, the output power may be effectively transferred from the power source 213 to the transmitting coil 211.

The relay coil module may include one or more auxiliary coils 220. The relay coil module may be embodied in a form of a patch made of a flexible material to be attachable to the skin of the living body 290. In an example, the relay coil module may include a housing configured to maintain the distance 221 between the transmitting coil 211 and the auxiliary coil 220. In this example, the relay coil module may be configured to be replaced with another relay coil module having another auxiliary coil 220 of different size and having a different distance, or the housing of the relay coil module may be configured to regulate the distance 221. The distance 221 between the transmitting coil 211 and the auxiliary coil 220 may be changeable The wireless power receiver 230 includes the receiving coil 231 and a charging element 232. The wireless power receiver 230 may transfer power received through the receiving coil 231 to the charging element 232

In an example, a capacitor may be connected to each of the transmitting coil 211, the auxiliary coil 220, and the receiving coil 231. A structure in which the capacitor is connected to the transmitting coil 211 may be referred to herein as a transmitting resonator, a structure in which the capacitor is connected to the auxiliary coil 220 may be referred to herein as an auxiliary resonator, and a structure in which the capacitor is connected to the receiving coil 231 may be referred to herein as a receiving resonator. The transmitting resonator, the auxiliary resonator, and the receiving resonator may have respective resonant frequencies that are equal to or different from one another. Thus, a combination between the transmitting resonator and the auxiliary resonator, and a combination between the auxiliary resonator and the receiving resonator may form mutual coupling. The mutual coupling may also be referred to herein as mutual resonance. However, the transmitting resonator and the receiving resonator may have a mutual coupling coefficient less than a threshold with respect to each other, and thus there may be weak mutual coupling formed between the transmitting resonator and the receiving resonator. Thus, the mutual coupling between the transmitting resonator and the receiving resonator may be disregarded because it is sufficiently smaller than the mutual coupling between the transmitting resonator and the auxiliary resonator and the mutual coupling between the auxiliary resonator and the receiving resonator.

Although a form of the transmitting coil 211, the auxiliary coil 220, and the receiving coil 231 is illustrated as a circular loop and the size 222 of the auxiliary coil 220 is illustrated as a diameter of the circular loop in FIG. 2, examples are not limited thereto, and other shapes and sizes are considered to be well within the scope of the present disclosure.

Figure 3:
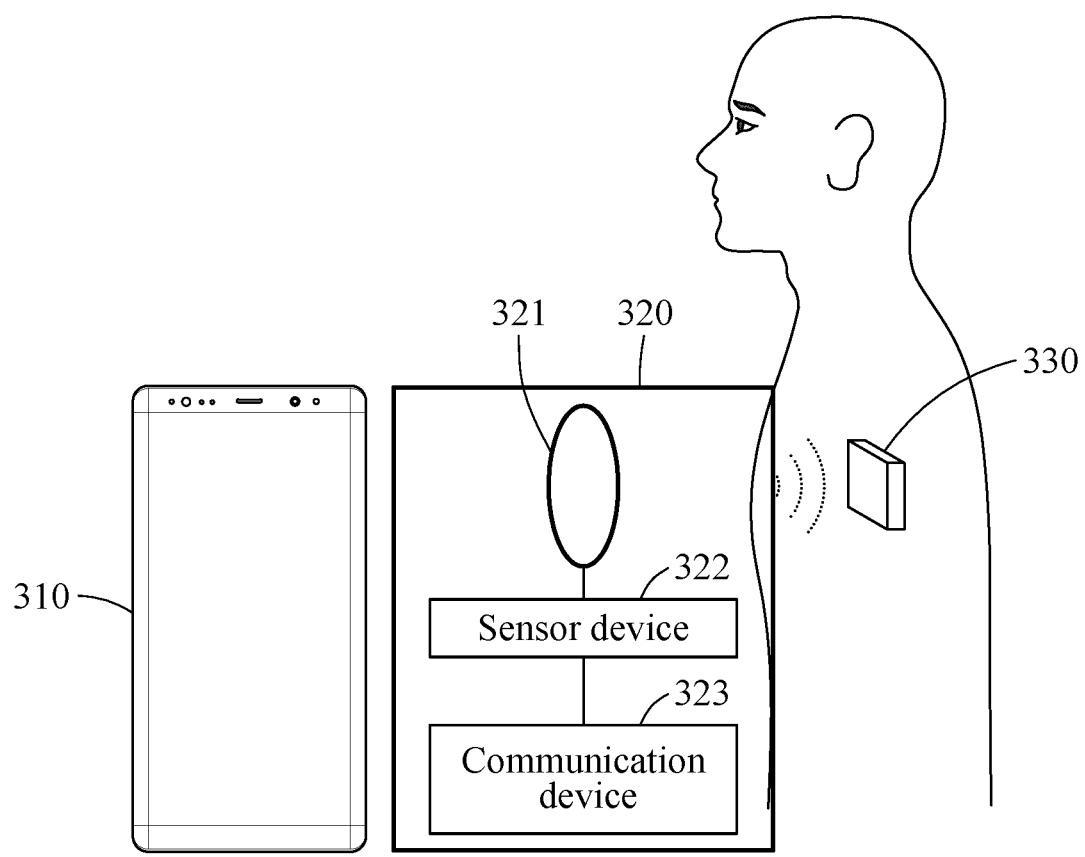
FIG. 3 is a diagram illustrating an example of a relay coil module attached to a living body.

FIG. 3 is a diagram illustrating an example of a relay coil module attached to a living body.

Referring to FIG. 3, a relay coil module 320 further includes a sensor device 322 and a communication device 323 in addition to an auxiliary coil 321.

The sensor device 322 may sense power-related information from the auxiliary coil 321. For example, the sensor device 322 may sense, as the power-related information, strength of a voltage applied to the auxiliary coil 321, strength of a current flowing in the auxiliary coil 321, and strength of a magnetic field radiated from the auxiliary coil 321.

The communication device 323 may transmit the sensed power-related information to a wireless power transmitter 310. For example, as described above with reference to FIG. 2, the communication device 323 of the relay coil module 320 may exchange information with the wireless power transmitter 310 through NFC or BLE communication.

The wireless power transmitter 310 may receive the power-related information of the auxiliary coil 321 from the relay coil module 320. In an example, the wireless power transmitter 310 may output guidance information to indicate at least one of a change in a distance between a transmitting coil and the auxiliary coil 321 or maintenance of the distance, based on the received power-related information. In an example, the wireless power transmitter 310 may output, in a form of visual information or audio information, the guidance information that instructs or requests a user to move the wireless power transmitter 310 farther from a living body.

In another example, when the power-related information, for example, the strength of the voltage, the current, and the magnetic field of the auxiliary coil 321, indicates its maximum, the wireless power transmitter 310 may activate the auxiliary coil 321 having a size and a distance corresponding to the maximum strength. After impedance matching of the transmitting coil is performed, the wireless power transmitter 310 may wirelessly transmit power to a wireless power receiver 330 through the auxiliary coil 321.

Figure 4:
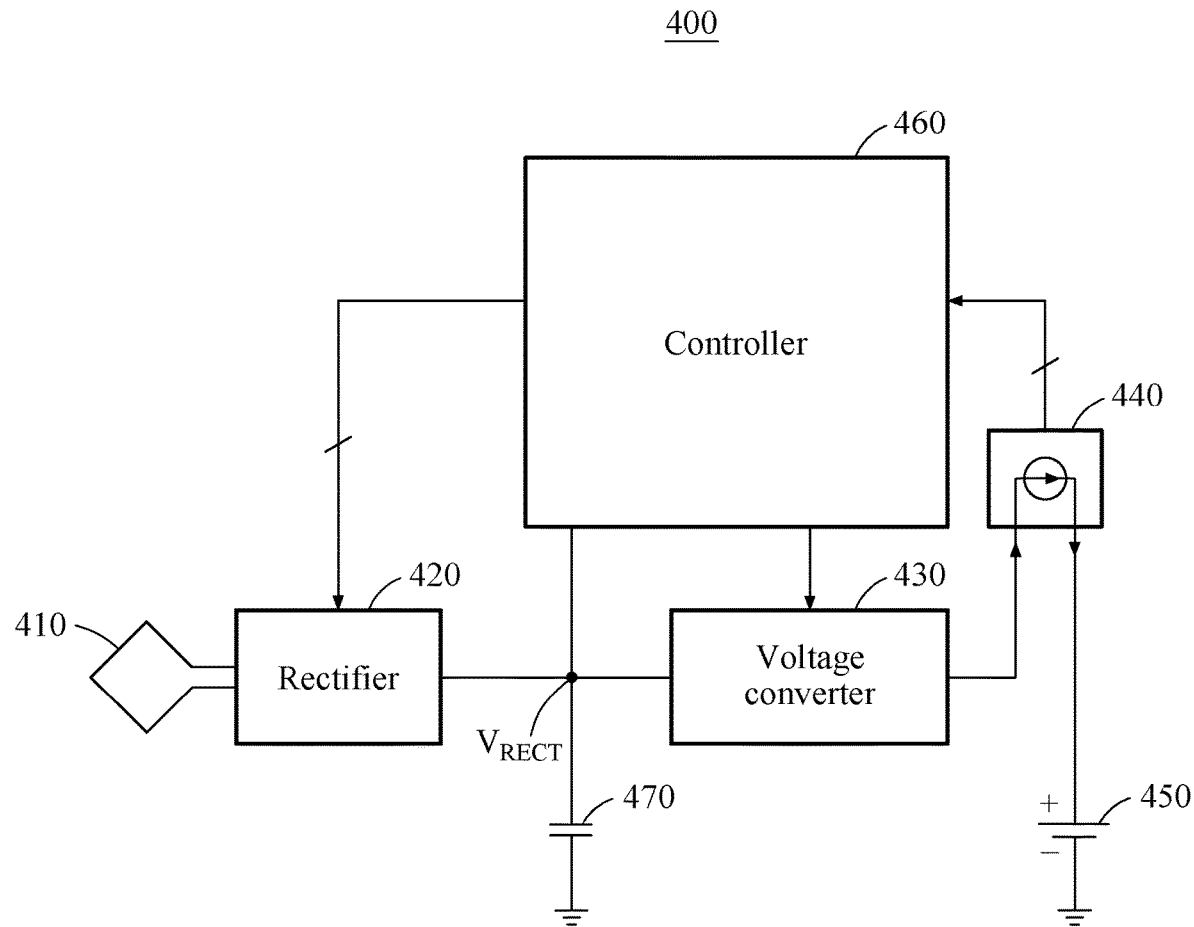
FIG. 4 is a diagram illustrating an example of a wireless power receiver.

FIG. 4 is a diagram illustrating an example of a wireless power receiver.

Referring to FIG. 4, a wireless power receiver 400 includes a circuit configured to set an input impedance that enables the reception of maximum power. The wireless power receiver 400 includes a receiving coil 410, a rectifier 420, a voltage converter 430, a current measurer 440, a charging element 450, and a controller 460. According to examples, the wireless power receiver 400 further includes a capacitor 470 that is connected to the rectifier 420, the voltage converter 430, and the controller 460 through a common node.

The receiving coil 410 may wirelessly receive power from a wireless power transmitter. The power to be transferred to the receiving coil 410 may be power to be received through a relay coil module described herein. The receiving coil 410 may output the received power in a form of an AC voltage.

The rectifier 420 may convert the AC voltage generated from the receiving coil 410 to a direct current (DC) voltage $V_{RECT}$, and output the DC voltage $V_{RECT}$. For example, the rectifier 420 may be an active rectifier having a high voltage conversion ratio, but a type of which is not limited thereto.

The capacitor 470 may store the DC voltage $V_{RECT}$ output from the rectifier 420. In the circuit, one end of the capacitor 470 may be connected to the voltage converter 430 and the rectifier 420 through the common node, and the other end of the capacitor 470 may be connected to a reference voltage terminal, for example, a ground terminal.

The voltage converter 430 may generate a charging current to be used to charge the charging element 450 that is provided in a form of a battery or a capacitor, based on the DC voltage $V_{RECT}$ output from the rectifier 420. The voltage converter 430 may convert the DC voltage $V_{RECT}$ transferred from the rectifier 420 to a charging voltage for charging the charging element 450. The voltage converter 430 may be a DC-DC converter such as, for example, a buck-boost converter. The voltage converter 430 may also be referred to as a charger.

The current measurer 440 may monitor the charging current transferred from the voltage converter 430 to the charging element 450. The current measurer 440 may measure the charging current transferred to the charging element 450, and transfer a result of the measuring to the controller 460. The current measurer 440 may include various types of current sensors, for example, a parallel connection-type sensor and an indirect-type sensor in addition to a series connection-type current sensor. The current measurer 440 may also be referred to as a current monitor.

The controller 460 may control an operation of each component of the wireless power receiver 400. The controller 460 may execute functions and instructions associated with wireless power reception, and include a processor such as a central processing unit (CPU) and/or a neural processing unit (NPU), and a memory.

In an example, the controller 450 may perform a control operation for optimal impedance matching or received power optimization of the wireless power receiver 400. The control operation may be performed in a form of a feedback loop along which an operation of monitoring the charging current to be transferred to the charging element 450 and an operation of controlling an operation of the voltage converter 430 based on a result of the monitoring are controlled automatically and repeatedly. During the control operation, the controller 460 may search for a target threshold voltage that forms a maximum charging current, or a target charging current. The controller 460 may find an optimal input impedance through voltage regulation by controlling the voltage converter 430. Such a control operation for optimal impedance matching, and such an operation of searching for the target threshold voltage may be performed on a periodic basis.

The controller 460 may set or regulate a threshold voltage based on the result of measuring the charging current received from the current measurer 440, and control the voltage converter 430. In an example, an initial value of the threshold voltage may be an arbitrary value or a preset value, and the controller 460 may search for the target threshold voltage that maximizes the charging current by measuring a change in a level of the charging current while changing the value of the threshold voltage based on the result of measuring the charging current. The target threshold voltage that is obtained through the searching may correspond to a threshold voltage, or a value of the threshold voltage, that matches an input impedance to an optimal load impedance. A value of the threshold voltage used herein may also indicate herein a magnitude of the threshold voltage, and they are interchangeably used herein.

The level of the charging current to be transferred to the charging element 450 may be regulated as the controller 460 controls the voltage converter 430. The controller 460 may change the input impedance by regulating a magnitude of the DC voltage $V_{RECT}$ which is an output voltage of the rectifier 420 by controlling the voltage converter 430 for the optimization of received power, and then search for the target threshold voltage which is a threshold voltage that maximizes the level of the charging current. A level of the charging current used herein may also indicate herein a magnitude of the charging current.

In an example, the controller 460 may control the voltage converter 430 based on the result of measuring the charging current and the DC voltage $V_{RECT}$ output from the rectifier 420. The controller 460 may compare the magnitude of the DC voltage $V_{RECT}$ output from the rectifier 420 and the threshold voltage, and determine whether to control the voltage converter 430 based on a result of the comparing.

The controller 460 may include a comparator configured to compare the magnitude of the DC voltage $V_{RECT}$ output from the rectifier 420 and the threshold voltage, and a control logic circuit configured to generate a voltage control signal to be transferred to the voltage converter 430 based on an output of the comparator. When the magnitude of the DC voltage $V_{RECT}$ is greater than a currently set threshold voltage by comparing the magnitude of the DC voltage $V_{RECT}$ and the threshold voltage, the control logic circuit may transfer the voltage control signal (e.g., a high logic signal) to the voltage converter 430.

When the voltage converter 430 receives the voltage control signal from the controller 460, the voltage converter 430 may regulate the magnitude of the DC voltage $V_{RECT}$ output from the rectifier 420. When the voltage converter 430 receives the voltage control signal, the voltage converter 430 may regulate the DC voltage $V_{RECT}$ output from the rectifier 420 to be equal or similar to the currently set threshold voltage. Through this, the DC voltage $V_{RECT}$ may change to be in a form that fluctuates in an approximate value range of the threshold voltage. As described, the voltage converter 430 may regulate a magnitude of an output voltage of the rectifier 420 such that it reaches the threshold voltage.

The controller 460 may measure a change in the level of the charging current, and regulate the magnitude of the threshold voltage based on the measured change in the level of the charging current. The controller 460 may search for the target threshold voltage that maximizes the level of the charging current based on the change in the level of the charging current occurring as the threshold voltage is regulated. For example, the controller 460 may determine the target threshold voltage which is a threshold voltage at a time when the level of the charging current is at its greatest, and then regulate the magnitude of the DC voltage $V_{RECT}$ output from the rectifier 420 by controlling the voltage converter 430 based on the determined target threshold voltage.

As described above, in an environment with various depths of insertion of the wireless power receiver 400 in a living body and with various magnitudes of transmitted power, the wireless power receiver 400 may achieve optimal impedance matching and maximize received power, and automatically regulate a resonant impedance based on a change in the received power. In addition, charging power of the charging element 450 may increase at a depth by which the wireless power receiver 400 is implanted in the living body, and a maximum insertion depth or a maximum chargeable depth by which wireless power transfer is enabled may increase.

Figure 5:
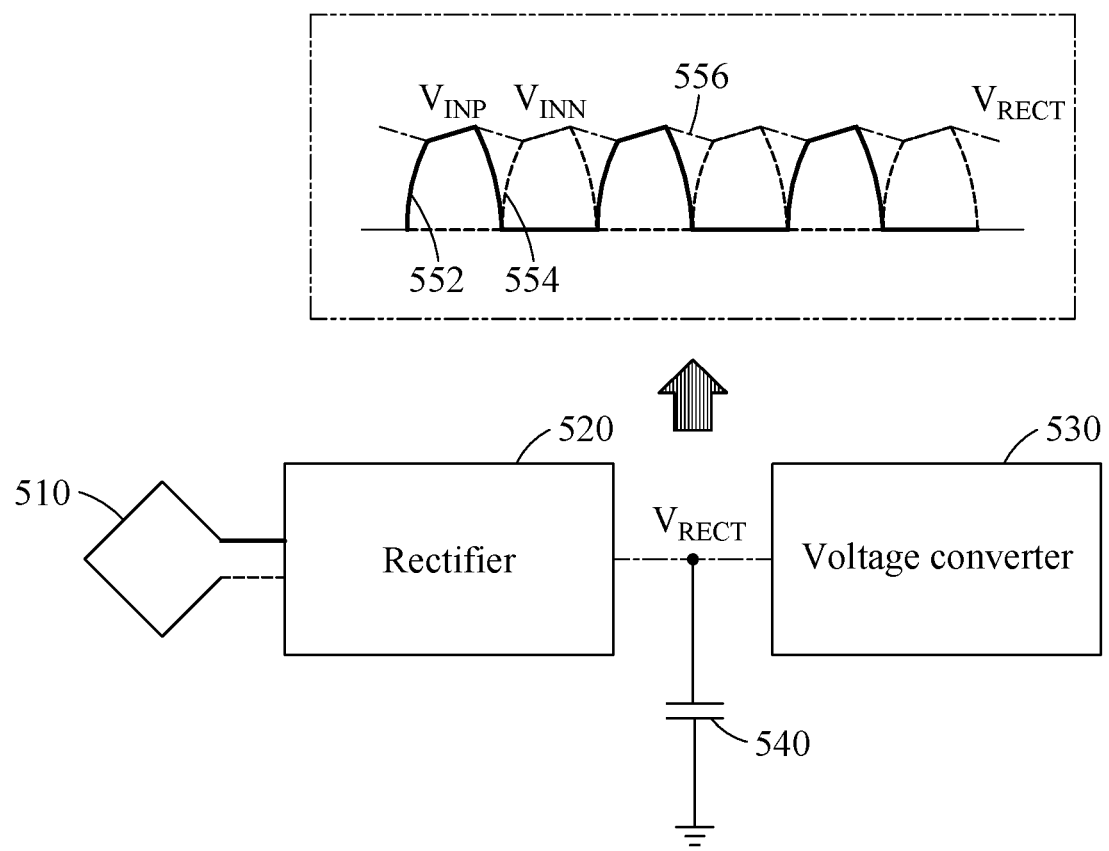
FIG. 5 is a diagram illustrating an example of impedance matching in a wireless power receiver.

FIG. 5 is a diagram illustrating an example of impedance matching in a wireless power receiver.

Referring to FIG. 5, as a part of an entire circuit of a wireless power receiver, the circuit includes a receiving coil 510, a rectifier 520, a voltage converter 530, and a capacitor 540.

The receiving coil 510 may wirelessly receive power and form an AC voltage. The rectifier 520 may convert the AC voltage transferred from the receiving coil 510 to a DC voltage $V_{RECT}$ 556, and output the DC voltage $V_{RECT}$ 556. The DC voltage $V_{RECT}$ 556 output from the rectifier 520 may be stored in the capacitor 540. For example, when AC power output from the receiving coil 510 has a voltage waveform of $V_{INP}$ 552 and a voltage waveform of $V_{INN}$ 554 as illustrated, an example of a voltage waveform of the DC voltage $V_{RECT}$ 556 output from the rectifier 520 is as illustrated in FIG. 5.

In the wireless power receiver implanted in a living body, a load impedance of the receiving coil 510 configured to receive power may be equal to an input impedance $R_{IN,RECT}$ of the rectifier 520 included in the wireless power receiver, and an optimal load impedance required by the receiving coil 510 may vary based on a depth by which the wireless power receiver is inserted in the living body. In general, when the depth of the insertion of the wireless power receiver in the living body increases, a greater load impedance may be required for optimal power transfer. For the wireless power receiver inserted in the living body to have the optimal load impedance in various insertion depths, the input impedance $R_{IN,RECT}$ of the rectifier 420 may need to be variable.

An impedance may be indicated as a ratio between a voltage and a current. In impedance matching, a voltage or current may be determined first, and then an impedance may be determined. By limiting a voltage or current to a specific voltage or current irrespective of a magnitude of power received by the wireless power receiver through the receiving coil 510, it is possible to regulate an impedance. The input impedance $R_{IN,RECT}$ may be determined based on a relationship between the input voltage (which is the AC voltage $V_{INP}$ 552 and $V_{INN}$ 554 generated in the receiving coil 510) and the input power $P_{IN}$ of the wireless power receiver. Thus, by regulating the DC voltage $V_{RECT}$ 556 having a value almost the same as the input voltage in the given input power $P_{IN}$, it is possible to regulate the input impedance $R_{IN,RECT}$.

By regulating the DC voltage $V_{RECT}$ 556 through the voltage converter 530, the input impedance $R_{IN,RECT}$ may be regulated as represented by Equation 1.

$$R_{IN,RECT} = \frac{V_{IN,rms}^2}{P_{IN}} \cong \frac{V_{RECT}^2}{2P_{IN}} \qquad \text{[Equation 1]}$$

In Equation 1, $V_{IN,rms}$ denotes a root mean square of an input voltage $V_{IN}$ of the wireless power receiver, and $P_{IN}$ denotes input power. The wireless power receiver may change a regulation level of the voltage converter 530 for $V_{RECT}$ 556, and an impedance may increase or decrease by such a change.

As described above, the wireless power receiver may regulate an input impedance of the wireless power receiver by regulating the DC voltage $V_{RECT}$ 556 which is an output voltage of the rectifier 520. The wireless power receiver may control the voltage converter 530 connected to the rectifier 520, thereby regulating the DC voltage $V_{RECT}$ 556 and matching the input impedance $R_{IN,RECT}$ to an optimal load impedance.

Figure 6:
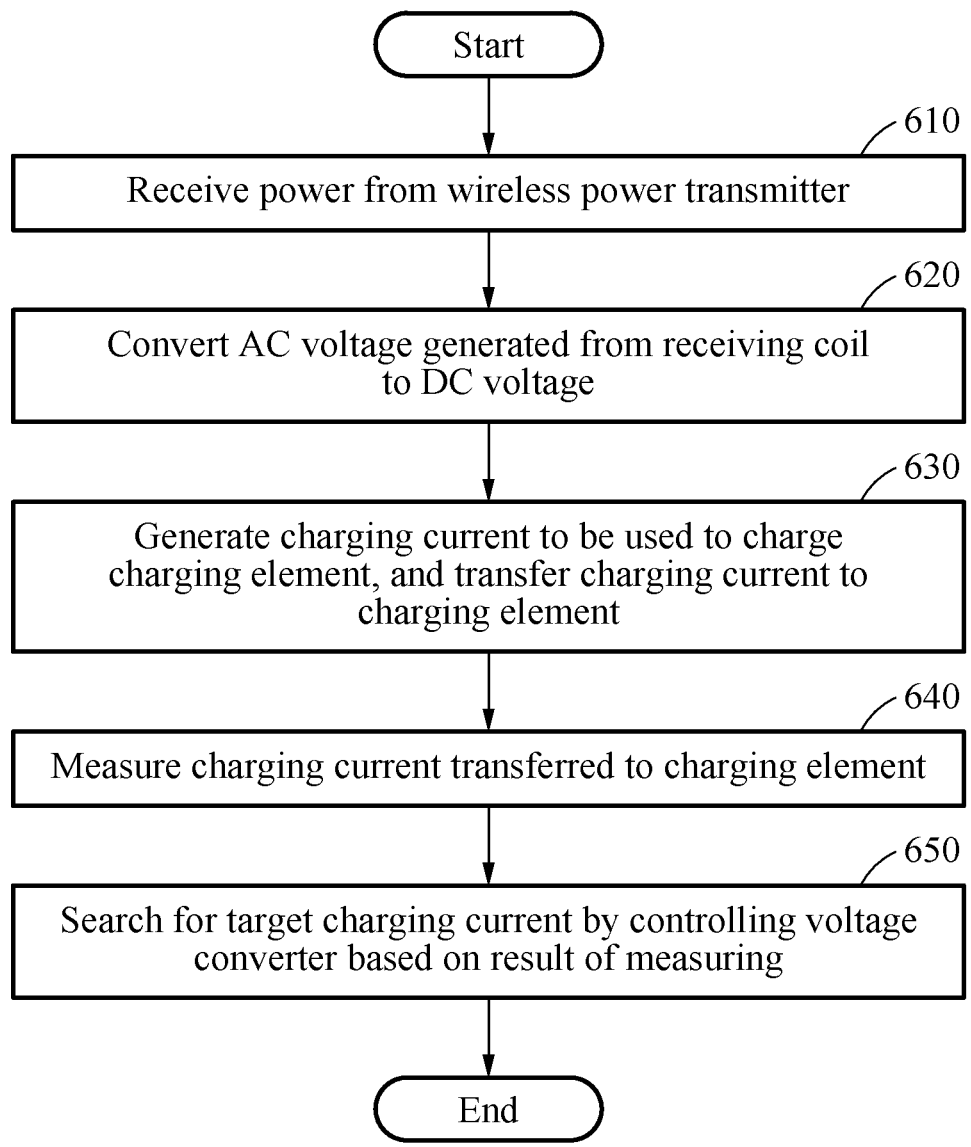
FIG. 6 is a diagram illustrating an example of a wireless power reception method.

FIG. 6 is a diagram illustrating an example of a wireless power reception method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In an example, the wireless power reception method may be performed by a wireless power receiver described herein. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, the wireless power receiver wirelessly receives power from a wireless power transmitter through a receiving coil. The receiving coil may generate an AC voltage based on received power, and output the generated AC voltage.

In operation 620, the wireless power receiver converts the AC voltage generated from the receiving coil to a DC voltage, using a rectifier. The DC voltage may be stored in a capacitor and transferred to a voltage converter.

In operation 630, the wireless power receiver generates a charging current to be used to charge a charging element and transfers the generated charging current to the charging element, using the voltage converter using the DC voltage as an input. The wireless power receiver may convert the DC voltage output from the rectifier to a charging voltage for charging the charging element using the voltage converter, and charge the charging element based on the charging voltage and the charging current.

In operation 640, the wireless power receiver measures the charging current transferred from the voltage converter to the charging element, using a current measurer. In an example, the wireless power receiver may sense a change in a level of the charging current in real time using a current sensor.

In operation 650, the wireless power receiver searches for a target charging current by controlling the voltage converter based on a result of measuring the charging current. The target charging current may correspond to a charging current of which a level is at its greatest due to optimal impedance matching. The wireless power receiver may regulate a magnitude of an output voltage of the rectifier by controlling the voltage converter based on a regulatable threshold voltage, and search for the target charging current based on the change in the level of the charging current that occurs as the magnitude of the output voltage of the rectifier is regulated. The wireless power receiver may search for a target threshold voltage that forms the target charging current by measuring the change in the level of the charging current while changing the threshold voltage.

In an example, such an operation of searching for the target charging current may include comparing a magnitude of the DC voltage output from the rectifier and the threshold voltage, and determining whether to control the voltage converter based on a result of the comparing. In response to the magnitude of the DC voltage output from the rectifier being greater than the threshold voltage, the wireless power receiver may transfer a voltage control signal to the voltage converter. When the voltage converter receives the voltage control signal, the voltage converter may regulate the magnitude of the DC voltage output from the rectifier. Thus, the magnitude of the DC voltage output from the rectifier may be regulated to be equal or similar to the threshold voltage.

The wireless power receiver may determine whether to regulate the threshold voltage based on the change in the level of the charging current. The wireless power receiver may search for the target threshold voltage that maximizes the level of the charging current, based on the change in the level of the charging current occurring by the regulation of the threshold voltage. The wireless power receiver may determine the target threshold voltage, which is a threshold voltage at a time when the level of the charging current to be transferred to the charging element is at its greatest, and regulate the magnitude of the DC voltage output from the rectifier by controlling the voltage converter based on the determined target threshold voltage.

The operation of searching for the target charging current, or the target threshold voltage, for impedance matching optimization will be described in detail with reference to FIG. 7.

Figure 7:
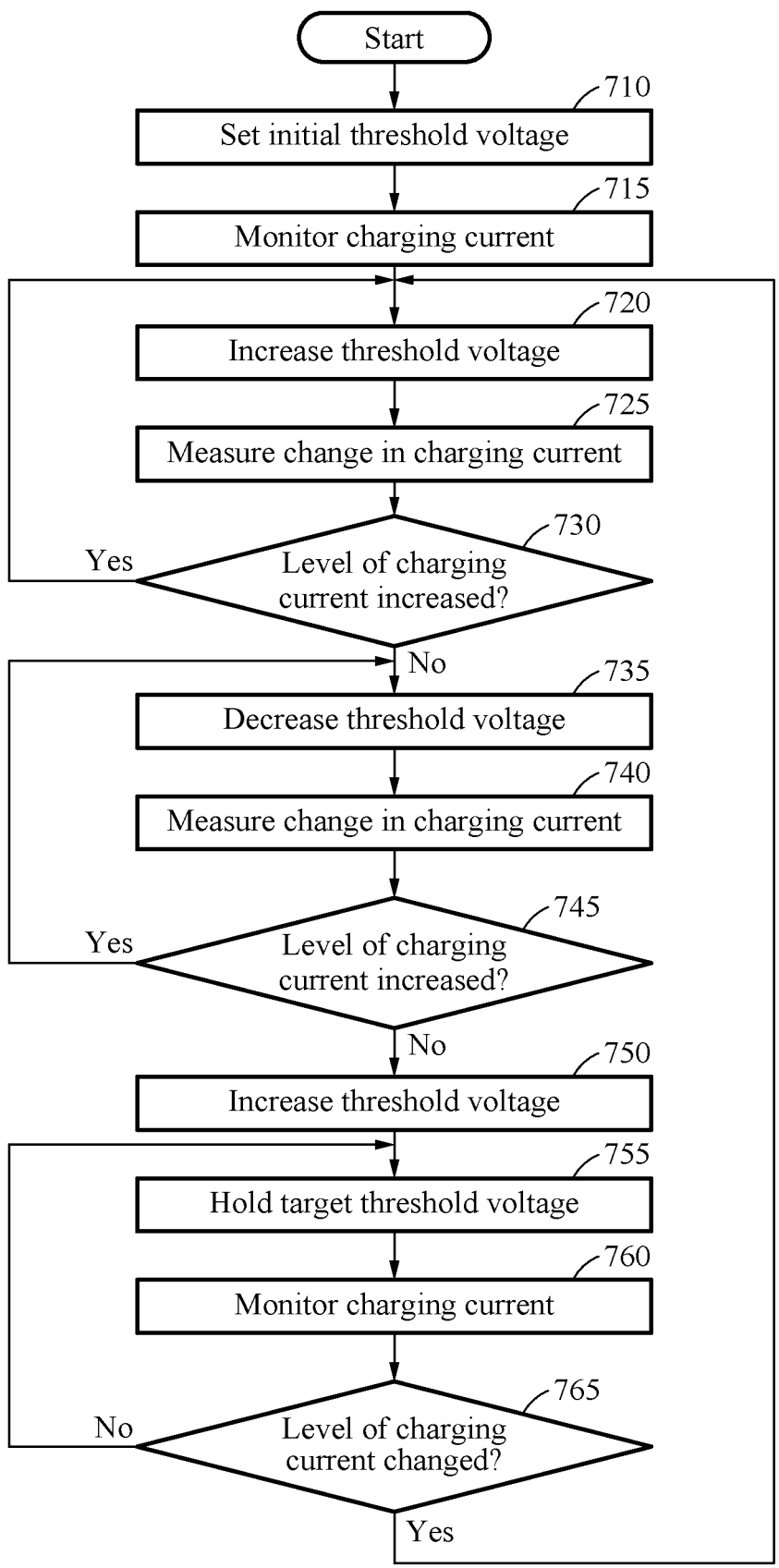
FIG. 7 is a diagram illustrating an example of searching for a target charging current.

FIG. 7 is a diagram illustrating an example of searching for a target charging current. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. In an example, the method of searching for a target charging current may be performed by a wireless power receiver described herein. In addition to the description of FIG. 7 below, the descriptions of FIGS. 1-6 are also applicable to FIG. 7, and are incorporated herein by reference. Thus, the above description may not be repeated here.

Referring to FIG. 7, in operation 710, the wireless power receiver sets an initial value of a threshold voltage. The initial value of the threshold voltage may be set to be an arbitrary value or a preset value. In operation 715, the wireless power receiver monitors a charging current that is transferred to a charging element after being output from a voltage converter.

In operation 720, the wireless power receiver increases the threshold voltage set as the initial value in operation 710. For example, the threshold voltage may increase by a basic unit. In this example, when a magnitude of the threshold voltage is represented by a digital bit value, the magnitude of the threshold voltage may increase by a digital bit value corresponding to 1.

After the threshold voltage increases, the wireless power receiver may compare a magnitude of a DC voltage output from a rectifier of the wireless power receiver and the increased magnitude of the threshold voltage, and determine whether to transfer a voltage control signal to the voltage converter based on a result of the comparing. For example, when the magnitude of the DC voltage output from the rectifier is greater than the increased magnitude of the threshold voltage, the voltage control signal may be transferred to the voltage converter, and the voltage converter may regulate the magnitude of the DC voltage output from the rectifier based on the corresponding threshold voltage.

In operation 725, the wireless power receiver measures a change in the charging current occurring by the increase in the threshold voltage. In operation 730, the wireless power receiver determines whether a level of the charging current increases by the increase in the threshold voltage. When the level of the charging current is determined to increase, the wireless power receiver returns to operation 720 and increases the current magnitude of the threshold voltage. The wireless power receiver may measure the change in the charging current occurring by regulating the threshold voltage while keep increasing the threshold voltage until the level of the charging current does not increase.

In operation 735, when the level of the charging current is determined not to increase in operation 730, the wireless power receiver decreases the current magnitude of the threshold voltage. For example, a subsequent magnitude of the threshold voltage may be decreased from the current magnitude of the threshold voltage by a digital bit value corresponding to 1. Subsequently, in operation 740, the wireless power receiver measures a change in the charging current occurring by the decrease in the threshold voltage. In operation 745, the wireless power receiver determines whether the level of the charging current increases by the decrease in the threshold voltage. When the level of the charging current is determined to increase, the wireless power receiver returns to operation 735 and decreases the current magnitude of the threshold voltage. The wireless power receiver may measure the change in the charging current occurring by regulating the threshold voltage while keep decreasing the threshold voltage until the level of the charging current does not increase.

In operation 750, when the level of the charging current is determined not to increase in operation 745, the wireless power receiver increases the current magnitude of the threshold voltage. The current magnitude of the threshold voltage may increase by a preset unit. In operation 755, the wireless power receiver determines, to be a target voltage threshold, the threshold voltage that is determined by the increase in the threshold voltage in operation 750, and holds the determined target threshold voltage. When the target threshold voltage is determined, the charging current to be transferred to the charging element may correspond to a target charging current.

In operation 760, the wireless power receiver continues monitoring the charging current. In operation 765, the wireless power receiver determines whether the level of the charging current changes. When the level of the charging current is determined not to change in operation 765, the wireless power receiver returns to operation 755 and holds the target threshold voltage, and monitors the charging current in operation 760. When the level of the charging current is determined to change in operation 765, the wireless power receiver returns to operation 720 and increases the current magnitude of the threshold voltage and performs subsequent operations.

As described above, the wireless power receiver may automatically search for a target threshold voltage based on a result of monitoring a charging current and an output voltage of the rectifier. Through the target threshold voltage, it is possible to achieve impedance matching optimization and maximize a level of the charging current, thereby improving a power reception efficiency of the wireless power receiver. Such a process for the impedance matching optimization may be performed automatically and continuously. Thus, the impedance matching optimization may be achieved robustly against an environmental change, such as, for example, a change in a depth of insertion of the wireless power receiver in a living body, a change in a distance between the wireless power transmitter and the wireless power receiver, and the like.

The wireless power transfer apparatus 100, wireless power transmitter 110 and 210, relay coil module 120, wireless power receiver 130 and 400, controller 212, communication device 214, input device 215, output device 216, sensor device 322, communication device 323, rectifier 420, voltage converter 430, current measurer 440, controller 460, rectifier 520, voltage converter 530, and other apparatuses, devices, units, modules, and components described herein with respect to FIGS. 1, 2, 3, 4, and 5 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the wireless power reception method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power receiver comprising:
   a charging element;
   a receiving coil configured to wirelessly receive power from a wireless power transmitter;
   a rectifier configured to convert an alternating current (AC) voltage generated from the receiving coil to a direct current (DC) voltage, and to output the DC voltage;
   a voltage converter configured to generate a charging current to charge the charging element, based on the DC voltage output from the rectifier;
   a current measurer configured to measure the charging current transferred to the charging element; and
   a controller configured to control a level of the charging current generated from the voltage converter by transmitting a voltage control signal to the voltage converter, based on a result of the measuring.

2. The wireless power receiver of claim 1, wherein the controller is further configured to control the voltage converter based on the result of the measuring of the charging current and the DC voltage output from the rectifier.

3. The wireless power receiver of claim 2, wherein the controller is further configured to compare a magnitude of the DC voltage output from the rectifier and a threshold voltage, and to determine whether to control the voltage converter based on a result of the comparing.

4. The wireless power receiver of claim 3, wherein
   for the transmitting of the voltage control signal, the controller is further configured to transmit the voltage control signal to the voltage converter, in response to the magnitude of the output voltage being greater than the threshold voltage, and
   the voltage converter is further configured to regulate the magnitude of the DC voltage output from the rectifier, in response to the voltage control signal being received.

5. The wireless power receiver of claim 4, wherein the magnitude of the DC voltage output from the rectifier is regulated by the voltage converter to reach the threshold voltage.

6. The wireless power receiver of claim 3, wherein the controller is further configured to regulate a magnitude of the threshold voltage based on a change in the level of the charging current.

7. The wireless power receiver of claim 6, wherein the controller is further configured to search for a target threshold voltage that maximizes the level of the charging current based on the change in the level of the charging current occurring by the regulating of the magnitude of the threshold voltage.

8. The wireless power receiver of claim 6, wherein the controller is further configured to determine a target threshold voltage to be a magnitude of threshold voltage when the level of the charging current is greatest, and to regulate the magnitude of the DC voltage output from the rectifier by controlling the voltage converter based on the target threshold voltage.

9. The wireless power receiver of claim 1, further comprising:
a capacitor configured to store the DC voltage output from the rectifier,
wherein a first end of the capacitor is connected to the voltage converter and the rectifier, and a second end of the capacitor is connected to a reference voltage terminal.

10. The wireless power receiver of claim 1, comprises an implantable wireless power receiver configured to be implanted in a living body.

11. The wireless power receiver of claim 1, wherein the wireless power transmitter is comprises a smartphone, a tablet personal computer (PC), a cellular phone, an electronic notebook, or a wearable electronic device.

12. A wireless power reception method to be performed by a wireless power receiver, comprising:
wirelessly receiving power from a wireless power transmitter through a receiving coil;
converting an alternating current (AC) voltage generated from the receiving coil to a direct current (DC) voltage, using a rectifier;
generating a charging current to charge a charging element and transferring the generated charging current to the charging element, using a voltage converter;
measuring the charging current transferred to the charging element; and
searching for a target charging current by controlling the voltage converter by transferring a voltage control signal to the voltage converter, based on a result of the measuring.

13. The wireless power reception method of claim 12, wherein a level of the charging current is regulated by the controlling of the voltage converter.

14. The wireless power reception method of claim 12, wherein the searching comprises:

comparing a magnitude of the DC voltage output from the rectifier and a threshold voltage; and
determining whether to control the voltage converter based on a result of the comparing.

15. The wireless power reception method of claim 14, wherein the determining of whether to control the voltage converter comprises:
transferring the voltage control signal to the voltage converter, in response to the magnitude of the DC voltage output from the rectifier being greater than the threshold voltage, and
the voltage converter being configured to regulate the magnitude of the DC voltage output from the rectifier, in response to the voltage control signal being received.

16. The wireless power reception method of claim 14, wherein the searching comprises:
determining whether to regulate the threshold voltage based on a change in a level of the charging current.

17. The wireless power reception method of claim 16, wherein the searching comprises:
searching for a target threshold voltage that maximizes the level of the charging current based on the change in the level of the charging current occurring by the regulating of the threshold voltage.

18. The wireless power reception method of claim 16, wherein the searching comprises:
determining a target threshold voltage that is a magnitude of the threshold voltage when the level of the charging current is greatest; and
regulating the magnitude of the DC voltage output from the rectifier by controlling the voltage converter based on the determined target threshold voltage.

19. The wireless power reception method of claim 12, wherein the wireless power receiver comprises an implantable wireless power receiver configured to be implanted in a living body, and
the wireless power transmitter comprises a smartphone, a tablet personal computer (PC), a cellular phone, an electronic notebook, or a wearable electronic device.

20. A non-transitory computer-readable storage medium storing instructions that, when executed by a processor, cause the processor to perform the wireless power reception method of claim 12.

* * * * *